United States Patent
Oh et al.

[11] Patent Number: 5,854,663
[45] Date of Patent: Dec. 29, 1998

[54] LCD DEVICE AND METHOD OF FORMING THE SAME IN WHICH A BLACK MATRIX IS FORMED ON THE ORIENTATION LAYER AND COVERS THE ACTIVE SEMICONDUCTOR LAYER OF A TFT

[75] Inventors: Young-Jin Oh, Seoul; Jeong-Hyun Kim, Kyeongki-do; Kyoung-Nam Lim, Seoul, all of Rep. of Korea

[73] Assignee: LG Electronics Inc., Seoul, Rep. of Korea

[21] Appl. No.: 675,316

[22] Filed: Jul. 3, 1996

[30] Foreign Application Priority Data

Mar. 13, 1996 [KR] Rep. of Korea ......................... 96-6617

[51] Int. Cl.$^6$ .......................... G02F 1/136; G02F 1/1335; G02F 1/1333; G02F 1/1337
[52] U.S. Cl. ............................ 349/42; 349/106; 349/110; 349/123
[58] Field of Search .................................... 349/110, 111, 349/106, 42, 123, 162

[56] References Cited

U.S. PATENT DOCUMENTS

| | | | |
|---|---|---|---|
| 4,634,227 | 1/1987 | Nishimura et al. | 349/162 |
| 4,821,092 | 4/1989 | Noguchi | 349/111 |
| 4,881,797 | 11/1989 | Aoki et al. | 349/111 |
| 5,327,001 | 7/1994 | Wakai et al. | 349/110 |

OTHER PUBLICATIONS

"Dye Embedded BM Resin and Three Dimensional Picture Element Implemented by BM On ARRAY Technology for the First Time"; NIKKEI MICRODEVICES, Jul. 1994, pp. 60–62 (English translation attached hereto).

*Primary Examiner*—William L. Sikes
*Assistant Examiner*—Walter Malinowski

[57] ABSTRACT

A liquid crystal display device and method of forming a liquid crystal display device are disclosed. The device having a plurality of pixel electrodes for transmitting light, includes a first panel including an activation region for selectively activating the plurality of pixel electrodes, a first orientation layer formed on the activation region, and a light shielding pattern formed on the first orientation layer; a second panel including a second orientation layer; and a liquid crystal formed between the first and second panels. The device allows proper formation of microgrooves in the entire first orientation layer, for enhancing orientation of liquid crystal molecules, increasing contrast ratio and improving picture quality of the device.

24 Claims, 3 Drawing Sheets

LCD DEVICE AND METHOD OF FORMING THE SAME IN WHICH A BLACK MATRIX IS FORMED ON THE ORIENTATION LAYER AND COVERS THE ACTIVE SEMICONDUCTOR LAYER OF A TFT

BACKGROUND OF THE INVENTION

1. Field of the Invention

The present invention relates to a liquid crystal display (LCD) device and method of forming the LCD device and, more particularly, to an improved thin film transistor LCD device and an improve method of forming the thin film transistor LCD device for increasing contrast ratio of the device, preventing light leakage, eliminating formation of defective microgrooves in an orientation layer, and enhancing picture quality of the device.

2. Description of Related Art

Generally, a liquid crystal display device includes an electrode disposed in each pixel for orienting the position of the liquid crystal molecules of a liquid crystal sealed in the device. The liquid crystal controls transmission of light therethrough according to the voltage generated by the electrodes in the pixels.

In such a conventional liquid crystal device, an active type thin film transistor is used. This conventional TFT LCD (Thin Film Transistor Liquid Crystal Display) device includes TFTs and pixel electrodes arranged on a TFT panel or bottom plate, a color filter for displaying color and a common electrode which are disposed on a color filter panel or top plate, a liquid crystal (LC) injected between the top and bottom plates, and a pair of polarizers disposed on the outer surfaces of the top and bottom plates for selectively transmitting light.

In the above conventional LCD device, the device is designed to transmit light that passes through only the pixel electrodes and color filter and to cut off any other light. To do so, the conventional LCD device uses a light shielding layer (black matrix) formed in the color filter panel (top plate). However, in such cases, it is necessary to provide the black matrix formed on the top plate with extra margins to properly cover the TFT areas on the bottom plate. As a result, a larger black matrix occupying more space is required. This decreases the aperture ratio of the device.

Therefore, to overcome this problem, a method of forming the black matrix in the TFT panel (bottom plate) and not in the color filter panel (top plate) has been suggested recently. According to this method, the LCD device as shown in FIGS. 1 and 2, for example, is formed. FIG. 1 shows a pixel region of the device and FIG. 2 shows a cross sectional view along line II-II of FIG. 1.

As shown in FIGS. 1 and 2, the recently suggested method of forming an LCD device includes forming a gate electrode 2 and a gate line 2' on a transparent substrate 1, forming a gate insulating layer 4 thereon, and forming a semiconductor layer 5 and N+ semiconductor pattern 6 thereon. The semiconductor layer 5 and N+ semiconductor pattern 6 are formed by depositing a semiconductor layer and N+ semiconductor layer and removing them except where the TFT element is formed.

Thereafter, a conductive material is deposited and patterned to form source and drain electrodes 8 and a data line 3. On the entire surface thereof, a transparent insulating layer 9 is deposited and patterned to form a contact hole in the drain electrode 8 for electrically connecting the drain electrode 8 and a pixel electrode. Then, a conductive layer is deposited and patterned to form the pixel electrode 10 in the pixel region of the device.

For the areas where metal wires cannot be used to shield light, a black organic material or black resin is used to form a black matrix pattern 18. Using the metal wires (gate line 2' and data line 3) and the black organic material of the black matrix pattern 18, light projecting from the backlight is shielded from transmitting through certain portions of the device. Only the pixel electrode areas permit transmission of light from the backlight.

Over the black matrix pattern 18, a first orientation layer 11 is formed to help orient the liquid crystal molecules in the liquid crystal portion 12. For example, a polyimide is used as the orientation layer. Once the first orientation layer 11 is formed, a rubbing process is carried out. The rubbing process creates microgrooves in the orientation layer, which serve to align liquid crystal molecules for selectively transmitting light.

Next, a color filter 15, a common electrode 14 and a second orientation layer 13 are formed on a substrate 16 to manufacture the color filter panel. This color filter panel and the TFT panel are assembled together with the liquid crystal 12 injected into the gap between the panels to form the liquid crystal display device.

In the display panel manufactured according to the above steps, the TFT including the semiconductor layer 5, N+ semiconductor layer 6, and source and drain electrodes 8 is turned on by the voltage transmitted through the gate line, which is a word line. Since the source is connected to the data line 3, data voltage signal from the data line 3 is transmitted through the source to the drain electrode 8. The pixel electrode 10 connected to the drain electrode 8 is then charged by the data voltage signal. Based on the voltage charged in the pixel electrode 10 and the common voltage provided by the common electrode 14, the liquid crystal molecules of the liquid crystal 12 are arranged and repositioned based on their predetermined direction and size. Because of the repositioning of the liquid crystal molecules, light is transmitted through the pixel electrodes, the liquid crystal 12, and the color filter 15 of the color filter panel.

In a conventional liquid crystal display device, the data voltage signal applied to the pixel electrodes controls the positioning or orientation of the liquid crystal molecules, which in fact controls transmission of light.

However, as explained hereinabove when the black matrix is formed in the TFT panel, margins which would have been required if the black matrix was formed in the color filter panel are unnecessary. Thus, the size of black matrix required is reduced and the effort to increase the aperture ratio is awarded. But this results in a black matrix which projects high from the rest of the pixel region. As a result, a large step coverage is formed, making it difficult to evenly form the first orientation layer 11 thereon. Furthermore, during the rubbing process, it becomes difficult to form microgrooves in the orientation layer around the black matrix region due to the high step coverage.

FIG. 3 shows a plan view of the TFT panel formed as explained above and FIG. 4 shows a sectional view along line IV—IV of FIG. 3.

Referring to FIGS. 3 and 4, the black matrix covers a surface of the TFT panel, except the pixel region 21, to form the black matrix region 28. The surface 20 denotes a surface of the TFT panel having the gate line or data line, the pixel electrode and its circuitry, and the passivation layer formed thereon. On the surface 20 of the TFT panel, the black matrix pattern 18 with a thickness greater than or equal to 1 μm is formed. Since a large step coverage is formed around the black matrix pattern 18, the large step coverage areas of the first orientation layer 11, such as "P" areas, have defective or no microgrooves formed therein. This causes improper orientation of the liquid crystal molecules around the black matrix pattern 18. For example, the liquid crystal molecules within 1–2 μm range of the black matrix pattern 18 are not properly oriented. Consequently, light leaks therethrough, contrast ratio decreases, and picture quality deteriorates.

SUMMARY OF THE INVENTION

Accordingly, it is an object of the present invention to provide an improved liquid crystal display device and method of forming the same which eliminates the above problems encountered in the conventional and recently developed liquid crystal display devices.

Another object of the present invention is to provide a liquid crystal display device including a black matrix formed in the TFT panel such that an inadequate orientation of the liquid crystal molecules in the liquid crystal can be eliminated to improve picture quality of the liquid crystal display.

A further object of the present invention is to provide a liquid crystal display device including a plurality of pixel electrodes formed in a TFT panel, an orientation layer formed and covering the circuitry in the TFT panel, and a black matrix formed on the orientation layer and covering the space between the pixel electrodes. The device permits proper formation of microgrooves in the orientation layer around the black matrix.

Further a method of manufacturing a TFT panel of a liquid crystal display device according to the embodiments of the present invention includes forming on a transparent substrate a word line (gate line or scanning line), a thin film transistor (TFT), a data line, and a pixel electrode, forming an orientation layer on the entire surface formed, forming a black resin layer on the orientation layer, and selectively etching the black resin layer to form a black matrix pattern.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the liquid crystal display device having a plurality of pixel electrodes for transmitting light according to the embodiments of the present invention, includes a first panel including an activation portion for selectively activating the plurality of pixel electrodes, a first orientation layer formed on the activation portion, and a light shielding pattern formed on the first orientation layer; a second panel including a second orientation layer; and a liquid crystal formed between the first and second panels.

Furthermore, the method of forming a liquid crystal display device having a plurality of pixel electrodes for transmitting light according to the embodiments of the present invention, includes the steps of forming a first panel including an activation portion for selectively activating the plurality of pixel electrodes, a first orientation layer formed on the activation portion, and a light shielding pattern formed on the first orientation layer; forming a second panel including a second orientation layer; and forming a liquid crystal between the first and second panels.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF THE PREFERRED EMBODIMENTS

Figure 1:
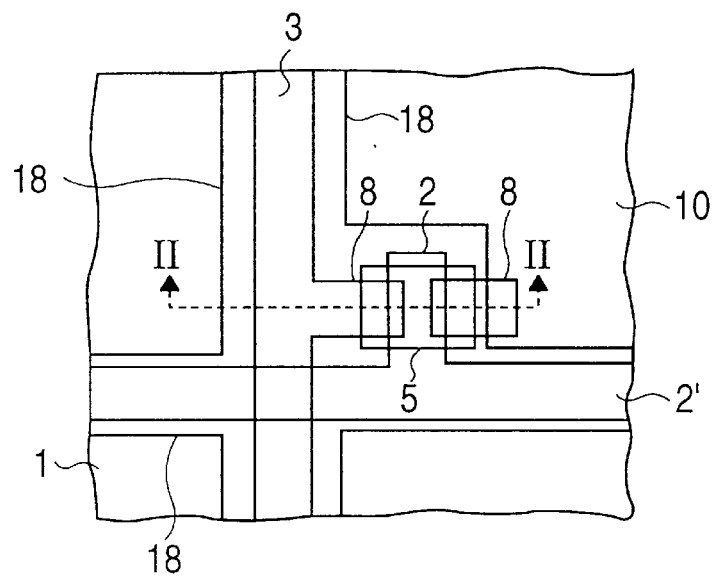
FIG. 1 is a layout view of a portion of a conventional LCD device.
Figure 2:
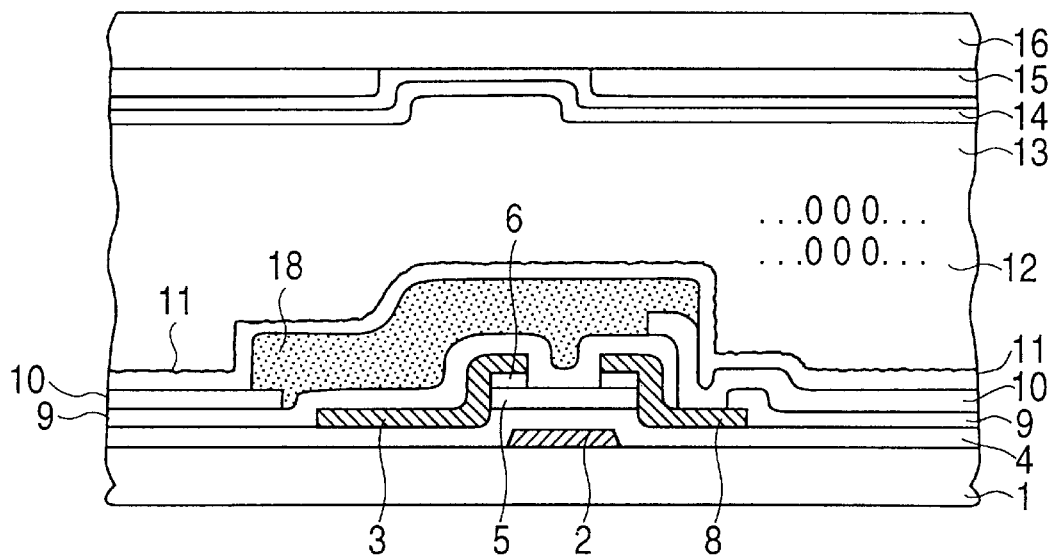
FIG. 2 is a cross-sectional view of FIG. 1, taken along line II—II.
Figure 3:
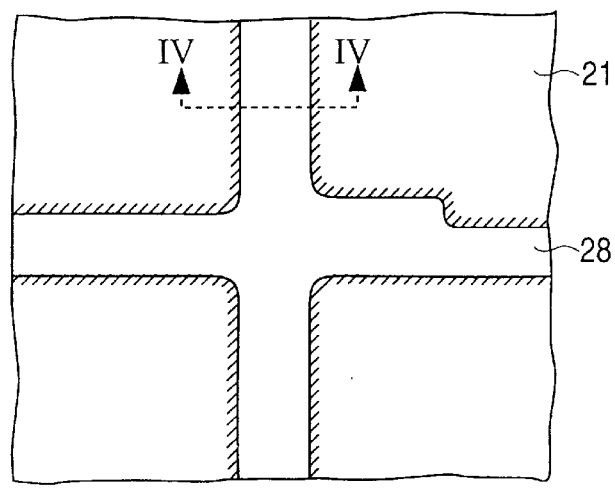
FIG. 3 is a plan view showing an upper surface of the LCD device of FIG. 1.
Figure 4:
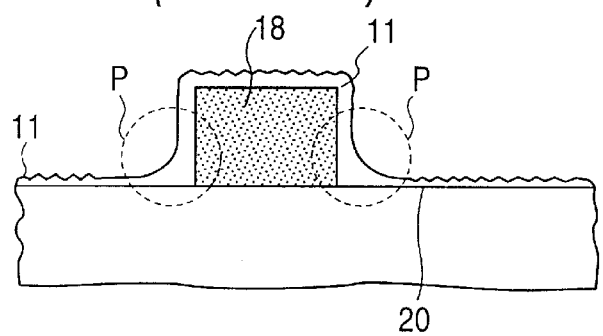
FIG. 4 is a cross-sectional view of FIG. 3, taken along line IV—IV.

Referring now in detail to the drawings for the purpose of illustrating preferred embodiments of the present invention, the liquid crystal display device as shown in FIGS. 5–8 includes a plurality of pixel electrodes 100 arranged in a matrix pattern, a plurality of data lines 30 formed between the pixel electrodes in a first direction, a plurality of gate lines 22' formed between the pixel electrodes in a second direction, and a plurality of TFTs for operating the pixel electrodes.

The method according to the embodiments of the present invention includes the following steps.

A gate electrode 22 is formed on a transparent substrate 101. On the formed surface, a gate insulating layer 40 is formed. By depositing a semiconductor layer and a N+ semiconductor layer on the gate insulating layer 40 and by removing the semiconductor layers except for the TFT region, a semiconductor layer 50 and a N+ semiconductor layer 60 are formed.

Then, a conductive material is deposited and patterned to form the data line 30, a source electrode 81 connected to the data line 30, and a drain electrode 82 for connecting with a pixel electrode. On the formed surface, a conductive layer is deposited and patterned to form the pixel electrode 100 connected to the drain electrode 82. But prior to depositing the conductive layer, a transparent insulating layer 90 is deposited and patterned to form a contact hole in the drain electrode 82 for connecting the drain electrode 82 with the pixel electrode 100. These steps permit formation of the pixel electrodes over the boundary region of the data lines, creating larger pixel electrodes.

In order to orient the liquid crystal molecules, a first orientation layer 210 having, for example, a polyimide, polyamide, or $SiO_2$ is formed and rubbed to produce microgrooves therein, which enhance orientation of the liquid crystal molecules.

In the alternative, to orient the liquid crystal molecules, for example, a polyvinyl cinnamate (PVCN), PVCN-F, polysiloxane series, or polyvinyl chloride (PVC) is used as the first orientation layer, which does not require a rubbing process to control transmission of light.

Then, on the orientation layer 210 formed either with or without rubbing, a light shielding pattern is formed except over the pixel electrodes to prevent transmission of light therethrough. As the light shielding pattern, a black matrix 280 is formed by coding, exposing and developing a black resin. The black resin, being sensitive to light like a photoresistive film, possesses a property that allows shielding of light after being developed. It is preferable to use a black resin which is heat resistant up to 250° and transmits less than 50% of light. The thickness of the coded black resin is about or below 1.5 µm.

In the alternative, the black matrix 210 is formed by depositing a light shielding layer possessing light blocking characteristics and patterning the light shielding layer via photolithography using a photoresist.

The black matrix pattern can be selectively formed over areas except the data lines, gate lines, and other areas except the pixel electrode region. But in order to facilitate the patterning process, the black resin is usually formed over all areas except the pixel electrode region. If light leaks through some other areas (excluding the pixel electrode region), the black resin layer is formed over those areas to prevent light leakage. But, other than the pixel electrode region, data lines and gate lines, the black resin layer must be formed over all areas. The metal wires (gate line 22' and data line 30) and the black organic material of the black matrix prevent transmission of light from the backlight. That is, light from the backlight is transmitted only through the pixel electrode region.

The steps hereinafter are the same as the conventional steps. In the process of forming a color filter panel, a color filter 150 is formed on a transparent substrate 160. Then, a common electrode 140 and a second orientation layer 130 are formed on the color filter 150. Once the color filter panel is formed, it is assembled together with the TFT panel, and a liquid crystal 120 is injected into the gap between the panels to form the improved LCD panel.

Figure 5:
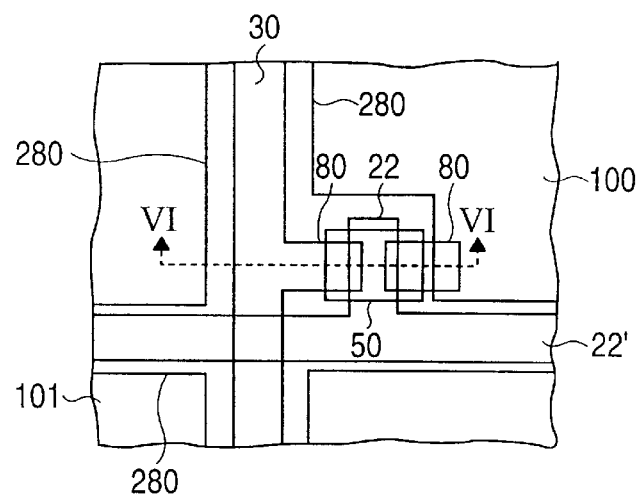
FIG. 5 is a layout view of a portion of an LCD device having a TFT panel according to the embodiment of the present invention.
Figure 6:
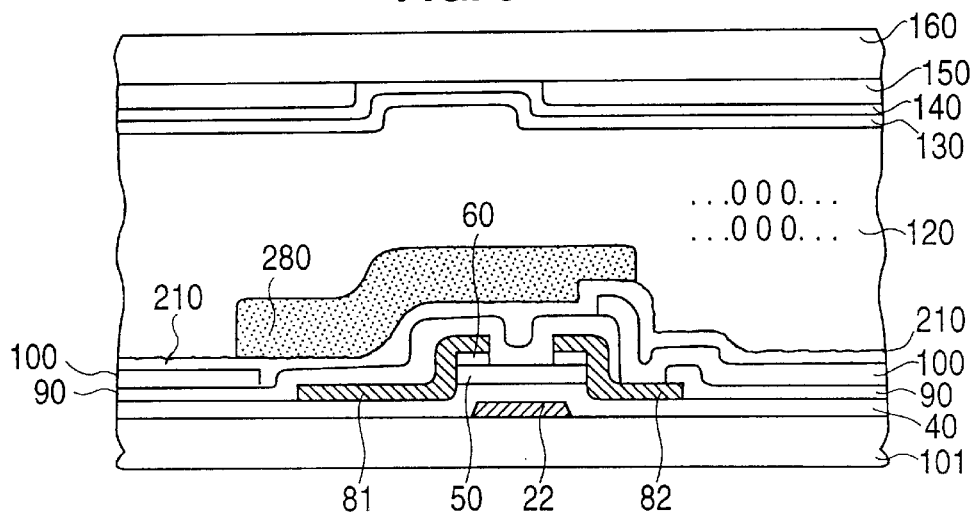
FIG. 6 is a cross-sectional view of FIG. 5, taken along line VI—VI, and a cross-sectional view of a color filter panel according to the embodiments of the present invention.
Figure 7:
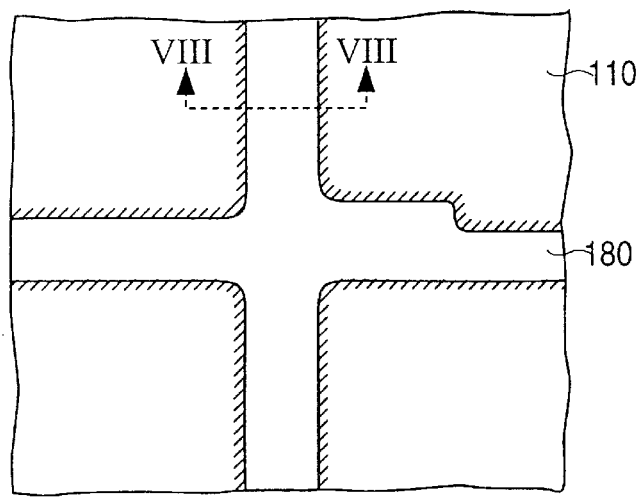
FIG. 7 is a plan view showing an upper surface of the LCD device shown in FIG. 5.
Figure 8:
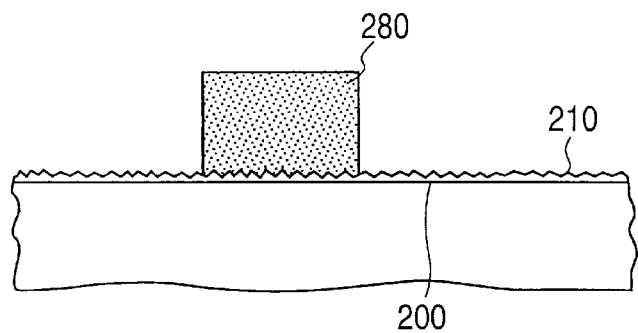
FIG. 8 is a cross-sectional view of FIG. 7, taken along line VIII—VIII.

FIG. 7 represents a plan view of FIG. 5 showing an upper surface of the LCD device according to the embodiments of the invention and FIG. 8 is a cross-sectional view of FIG. 7, taken along line VIII—VIII.

Referring to FIGS. 7 and 8, a black matrix region 180 is separated from a pixel region 110. As explained above, the structure of the TFT panel according to the embodiments of the present invention includes a surface 200 of the TFT panel formed with gate/data lines, pixel electrodes with their circuitry, and the passivation layer formed thereon. The first orientation layer 210 is evenly formed on the surface 200, and the black matrix 280 is formed on portions of the first orientation layer 210. Since the first orientation layer 210 is evenly distributed, microgrooves are formed in the orientation layer 210 with regularity. On the first orientation layer 210, the black matrix 280 with a thickness of greater than 1 µm is formed. Consequently, the orientation of the liquid crystal molecules around the black matrix 280 (1 to 2 µm range) is perfectly carried out. This increases contrast ratio and enhances picture quality.

Operation of the liquid crystal device according to the embodiments of the present invention is as follows.

The voltage signal transmitted through the gate line 22' turns on the semiconductor layers 50, 60 and source and drain of the TFT. Through the source connected to the data line 30, data voltage signal from the data line 30 is transmitted through the drain which charges the pixel electrode connected to the drain. Therefore, the voltage signal charged in the pixel electrode 100 and the common voltage signal provided by the common electrode 140 energize and control the orientation of liquid crystal molecules in the liquid crystal 120 according to the predetermined size and direction of the liquid crystal molecules. As the position of the liquid crystal molecules is varied, light is permitted to transmit through the pixel electrode 100, the liquid crystal 120 and the color filter 150 of the color filter panel.

In the above, the inverted staggered IOP (Inverted Staggered ITO On Passivation) type of an LCD device is explained. However, other staggered types, coplanar types or inverted coplanar types can be used. In such cases, a first orientation layer is formed over the data lines, gate lines, pixel electrodes, and TFTs, and a black matrix pattern is formed on the first orientation layer in accordance with the embodiments of the present invention. Although it has been explained that the common electrode and color filter are located in the top plate, for example, advantageous concepts and steps of the present invention are applicable to a TFT panel having a common electrode and/or a color filter therein.

As explained above, the LCD device according to the embodiments of the present invention includes a TFT panel having an orientation layer formed over a plurality of pixel electrodes, TFTs, gate lines and data lines, and a black matrix pattern formed on the orientation layer so as to prevent transmission of light except through the pixel electrode region. According to the invention, the LCD device eliminates formation of defective or bad quality microgrooves in the orientation layer, increases contrast ratio and enhances picture quality of the device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A liquid crystal display device having a plurality of pixel electrodes for transmitting light, the device comprising:

a first panel including an activation portion for selectively activating the plurality of pixel electrodes, a first orientation layer formed on the activation portion, and a black matrix formed on the first orientation layer, the activation portion including at least one semiconductor layer, the black matrix completely covering the at least one semiconductor layer;

a second panel including a second orientation layer; and a liquid crystal formed between the first and second panels.

2. A device of claim 1, wherein the activation portion includes a data line, a gate line, and a thin film transistor.

3. A device of claim 2, wherein the thin film transistor includes a source electrode connected to the data line, a gate electrode connected to the gate line, and a drain electrode connected to one of the plurality of pixel electrodes.

4. A device of claim 1, wherein the first panel further includes at least one of a common electrode and a color filter.

5. A device of claim 1, wherein the activation portion includes:

a gate line formed on a substrate, a gate insulator formed on the gate line, the at least one semiconductor layer including first and second semiconductor layers formed on the gate insulator, source and drain electrodes formed on the second semiconductor layer, and an insulating layer formed on the source and drain electrodes.

6. A device of claim 5, wherein the insulating layer includes a contact hole for connecting the drain electrode with one of the plurality of pixel electrodes.

7. A device of claim 1, wherein the black matrix is made of a black resin having at least one of the following qualities:

heat resistant up to about 250° C., under 50% transmission of light, and a thickness of about or less than 1.5 µm.

8. A device of claim 1, wherein the first orientation layer includes one of a polyimide, a polyamide, $SiO_2$, a polyvinyl cinnamate, a PVCN-F, a polysiloxane series, and a polyvinyl chloride.

9. A device of claim 1, wherein the second panel includes:

a color filter formed on a substrate, a common electrode formed on the color filter, and the second orientation layer formed on the common electrode.

10. A device of claim 1, wherein the first orientation layer is evenly distributed in an area directly surrounding the light shielding pattern.

11. A device of claim 1, wherein microgrooves with regularity are formed inside the first orientation layer directly surrounding the black matrix.

12. A device of claim 1, wherein the first panel further includes a source electrode and a drain electrode, one of the source and drain electrodes being connected to one of the plurality of pixel electrodes, the black matrix completely covering one of the source electrode and the drain electrode.

13. A device of claim 12, wherein the activation portion further includes a gate electrode formed on a substrate, and a gate insulator formed on the gate electrode, wherein portions of the source and drain electrodes are formed directly on the gate insulator.

14. A method of forming a liquid crystal display device having a plurality of pixel electrodes for transmitting light, the method comprising the steps of:

forming a first panel including an activation portion for selectively activating the plurality of pixel electrodes, a first orientation layer formed on the activation portion, and a black matrix formed on the first orientation layer, the activation portion including at least one semiconductor layer, the black matrix completely covering the at least one semiconductor layer;

forming a second panel including a second orientation layer; and forming a liquid crystal between the first and second panels.

15. A method of claim 14, wherein the step of forming a first panel includes the steps of:

forming a gate line and a data line on a substrate, and forming a thin film transistor connected to the gate line, the data line, and one of the plurality of pixel electrodes.

16. A method of claim 14, wherein the step of forming a first panel includes the steps of:

forming a gate line on a substrate, forming a gate insulator on the gate line, forming the at least one semiconductor layer including first and second semiconductor layers on the gate insulator, forming source and drain electrodes on the second semiconductor layer, and forming an insulating layer on the source and drain electrodes.

17. A method of claim 14, wherein the step of forming a first panel includes the step of:

providing at least one of a common electrode and a color filter in the first panel.

18. A method of claim 14, wherein the step of forming a first panel includes the step of:

forming the black matrix with a black resin having at least one of the following qualities:

heat resistant up to about 250° C., under 50% transmission of light, and a thickness of about or less than 1.5 µm.

19. A method of claim 14, wherein the step of forming a first panel includes the step of:

forming the first orientation layer using one of a polyimide, a polyamide, $SiO_2$, a polyvinyl cinnamate, a PVCN-F, a polysiloxane series, and a polyvinyl chloride.

20. A method of claim 14, wherein the step of forming a second panel includes the steps of:

forming a color filter on a substrate, forming a common electrode on the color filter, and forming the second orientation layer on the common electrode.

21. A method of claim 14, wherein the step of forming a first panel includes the step of:

distributing evenly the first orientation layer in an area directly surrounding the light shielding pattern.

22. A method of claim 14, wherein the step of forming a first panel includes the step of:

forming microgrooves with regularity inside the first orientation layer which directly surrounds the black matrix.

23. A method of claim 14, wherein the step of forming a first panel further includes the steps of:

forming a source electrode and a drain electrode on a substrate, connecting one of the source and drain electrodes to one of the plurality of pixel electrodes, and completely covering one of the source electrode and the drain electrode with the black matrix.

24. A method of claim 23, wherein the activation portion includes a gate electrode formed on the substrate, and a gate insulator formed on the gate electrode, wherein portions of the source and drain electrodes are formed directly on the gate insulator.

* * * * *